United States Patent
Yoshida et al.

[11] 3,762,458
[45] Oct. 2, 1973

[54] PNEUMATIC TIRE HAVING A GLASS CORD BREAKER LAYER

[75] Inventors: Tomonori Yoshida; Hirohiko Takagi; Katsuyuki Harakon, all of Tokyo; Norio Matsui, Tokorozawa, all of Japan

[73] Assignee: Bridgestone Tire Company Limited, Tokyo, Japan

[22] Filed: Nov. 22, 1971

[21] Appl. No.: 200,883

[30] Foreign Application Priority Data
Nov. 27, 1970 Japan.............................. 45/104393

[52] U.S. Cl............................................. 152/361 R
[51] Int. Cl................................................ B60c 9/18
[58] Field of Search...................................... 152/361

[56] References Cited
UNITED STATES PATENTS
3,599,696　8/1971　Hartz................................. 152/361
2,960,139　11/1960　Engstrom et al................ 152/361 X Primary Examiner—Gerald M. Forlenza
Assistant Examiner—George H. Libman
Attorney—Richard K. Stevens et al.

[57] ABSTRACT

A pneumatic tire having a breaker layer composed of a rubber coated glass cord layer and short cut fiber reinforced rubber layers arranged on both sides of the glass cord layer in the form a sandwich. This tire has an improved abrasion resistance, cornering power and plunger resistance.

5 Claims, 1 Drawing Figure

PATENTED OCT 2 1973
3,762,458
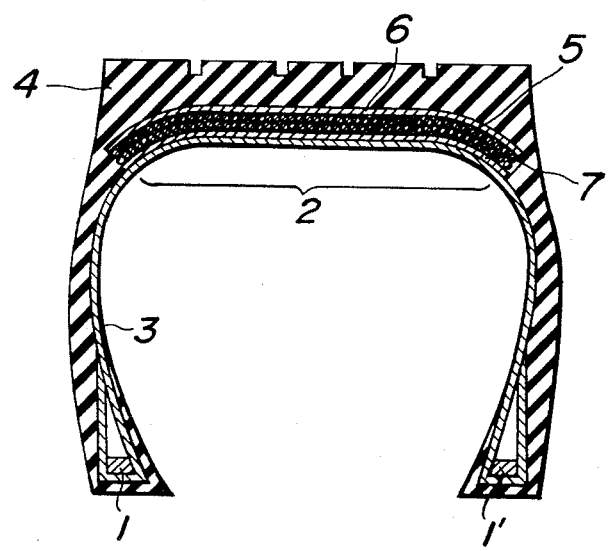

PNEUMATIC TIRE HAVING A GLASS CORD BREAKER LAYER

The present invention relates to an improved pneumatic tire containing glass cords as a breaker layer. More particularly, the present invention relates to a pneumatic tire in which short cut fiber reinforced rubber layers are arranged on the carcass side and on the tread side of a glass cord breaker layer.

The term "short cut fiber reinforced rubber" herein means rubber reinforced with short cut fibers.

Glass cord is superior to organic fiber cord in the heat resistance, dimensional stability and modulus of elasticity, and when rubber is reinforced with glass cord and used as a breaker layer of a pneumatic tire, the tire is excellent in various properties, particularly is excellent in the abrasion resistance (road test) and cornering power.

However, the pneumatic tire having a breaker layer composed of glass cords has serious drawbacks.

Firstly, when a car is running, dynamic bending transformation and impact transformation of the tire occur due to the road surface condition, and the glass cords are broken or crushed.

Secondly, in general, foreign materials, such as nails, glass pieces and gravels, are penetrated into the tire and reached its breaker layer during the use of the tire, particularly at the end of the use. In this case, if the tire has a breaker layer composed of conventional organic fibers, such as nylon, rayon, polyester and vinylon (polyvinyl alcohol) fibers, etc., breakage of the tire occurs only at the portion to which the foreign materials have been penetrated. On the contrary, if the tire has a glass cord breaker layer, the glass cords are crushed by the penetrated foreign materials and the breakage of the glass cords extends along the glass cord breaker layer. This is a cause of serious troubles.

In order to solve these drawbacks, there has been tried to arrange organic fiber cords, such as nylon cords, on the tread side of the glass cord breaker layer. However, a satisfactory result has not hitherto been obtained.

In addition to these drawbacks of glass cord, the inventors further have found a third drawback of glass cord, which is peculiar to glass cord and does not occur in organic fiber cord.

That is, in the vulcanization step of tire, the following step may be carried out. Namely, a tire is vulcanized at a high temperature and under a high pressure, and then the tire is taken out into an atmosphere at room temperature and under atmospheric pressure, and thereafter the tire is applied with air pressure to the inner side under a high pressure to stabilize the dimension of the tire. When the tire is taken out into the atmosphere at room temperature, cords composed of organic fibers other than glass fiber, such as rayon, nylon, vinylon and polyester fibers, etc., which are used as a reinforcing material of tire, that is, used in a carcass arranged on the inner side of breaker, are highly shrunk. As the result, glass cord breaker arranged directly adjacent to the rubber coated organic fiber cord layer (carcass) is compressed violently, and glass filaments constituting the glass cord of the breaker are compressed to decrease their tenacity and are broken during the car is running.

For instance, in a tire composed of 2 kinds of layers of a carcass layer reinforced with organic fiber cord and a glass cord breaker, glass cords constituting a glass cord breaker layer arranged on the carcass side are inferior in the tenacity to glass cords constituting another glass cord breaker layer arranged on the tread side.

Further, when organic fiber cords having different shrinkabilities, for example, nylon cord or rayon cord is used as a carcass cord, the nylon cord having a higher shrinkability decreases the tenacity of glass cord more than the rayon cord.

Further, even in the vulcanization treatment of conventional bias-belted tires in which rubber coated organic fiber cord layer, such as rubber coated nylon cord layer, is arranged on the tread side of the glass cord breaker, the above described phenomenon occurs between the glass cord breaker and the rubber coated organic fiber cord layer, whereby glass filaments are broken. Because, when the tire is cooled, the above described organic fiber cord shrinks considerably.

Among the above described three drawbacks of the tire having the glass cord breaker layer, the first drawback has already been solved by the inventors. That is, in order to decrease the bending transformation and impact transformation of glass cord, a short cut fiber reinforced rubber layer is arranged on the tread side of the glass cord breaker layer. In order to solve the second drawback, that is, the problem of plunger resistance against foreign materials, the inventors have confirmed that the arrangement of the short cut fiber reinforced rubber layer on the tread side of the glass cord breaker layer has a higher effect than the arrangement of a sole rubber layer or a rubber coated cord layer.

Furthermore, in order to solve the third drawback, the inventors have found that the following arrangement is more effective. That is, the glass cord breaker layer is not arranged directly adjacent to organic fiber cords having a high shrinkability, but such a layer that has a low shrinkability and does not transmit the shrinkage of the organic fiber cords to the glass cord breaker layer is arranged between the rubber coated organic fiber cord layer (carcass) and the glass cord breaker layer.

The present invention has been accomplished based on the above described investigations.

The object of the present invention is to obviate the above described drawbacks of conventional pneumatic tires having a glass cord breaker and to provide a pneumatic tire having an improved abrasion resistance (road test) and cornering power.

The pneumatic tire according to the present invention comprises a pair of beads, a carcass composed of a rubber coated cord layer extending from one bead to the other bead through a crown and fixed to the beads at the both ends, a tread covering the outer side of the carcass, and a breaker layer arranged in the crown and on the outside of the carcass and on the inside of the tread, said breaker layer consisting of at least one rubber coated glass cord layer and at least two short cut fiber reinforced rubber layers, and at least one of said short cut fiber reinforced rubber layers being arranged on the carcass side and on the tread side of the rubber coated glass cord layer, respectively.

It is not always necessary to use the same short cut fiber reinforced rubber layers on the carcass side and on the tread side of the rubber coated glass cord layer. The short cut fibers to be used in the present invention include short cut fibers of commonly used inorganic fibers, such as glass fibers, and organic fibers, such as vinylon, rayon and polyester fibers and the like. In the present invention, short cut fibers having a length of not longer than 30 mm, preferably 0.1 to 10 mm, a diameter of not larger than 100$\mu$, and a ratio of the length to diameter of not less than 10 are preferably used.

The term "rubber" to be used in the present invention means vulcanizable rubber, in which general natural rubber or synthetic rubbers, such as polybutadiene rubber, styrene-butadiene rubber, etc. alone or in admixture are mixed with conventional compounding ingredients for rubber.

The short cut fiber reinforced rubber to be used in the present invention can be obtained by compounding the short cut fibers and the rubber by means of a Banbury mixer or a calender roll. The compounding amount of short cut fibers is 5 to 100, preferably 20 to 40 parts by weight based on 100 parts of rubber. The thickness of the short cut fiber reinforced rubber layer is 0.5 to 10 mm, preferably 0.5 to 3 mm.

Then, an explanation will be made in detail with respect to the merits of the tire having a glass cord breaker layer according to the present invention.

Firstly, the glass cord breaker layer is very effectively protected against the bending transformation and impact transformation caused in the tire during the car is running. That is, although the short cut fiber reinforced rubber is poor in the tensile rigidity, the reinforced rubber is high in the bending rigidity, and consequently the reinforced rubber is very effective for preventing the breakage of glass cords. Moreover, when such short cut fiber reinforced rubber layers are arranged on both of the carcass side and the tread side of the glass cord breaker layer in the form of a sandwich, the bending rigidity of the glass cord breaker layer is improved synergistically.

As the result, in the tire according to the present invention, breakage and crushing of glass cords can be prevented during the car is running, and further the cornering power and abrasion resistance of tire, which are influenced by the bending rigidity of glass cords, can be remarkably improved.

Secondly, the short cut fiber reinforced rubber layer is more excellent in the plunger resistance against foreign materials at the end of the use of tire than sole rubber layer or rubber coated fiber cord layer. Accordingly, in the tire according to the present invention, breakage of glass cord layer caused by penetration of foreign materials can be prevented.

Thirdly, as described above, in the tire according to the present invention, even when organic fiber cords constituting a carcass are shrunk by heat, the short cut fiber reinforced rubber layer arranged on the carcass side of glass cord breaker layer does not substantially shrink, and consequently the shrinkage of the carcass is not transmitted to the glass cord breaker layer. Accordingly, filaments constituting the glass cord are not broken.

Moreover, in a conventional tire, in which rubber coated organic fiber cord layer is arranged on the tread side of glass cord breaker layer, the organic fiber cords shrink. On the contrary, in the tire according to the present invention, short cut fiber reinforced rubber layer, which is arranged on the tread side of glass cord breaker layer, does not substantially shrink, and consequently filaments constituting the glass cord and arranged adjacent to the short cut fiber reinforced rubber layer are not broken For a better understanding of the invention, reference is taken to the accompanying drawing, wherein:

FIG. 1 is a cross-sectional view of one embodiment of the pneumatic tires according to the present invention.

The tire shown in FIG. 1 comprises a pair of beads 1 and 1', a carcass 3 composed of a rubber coated cord layer extending from one bead 1 to the other bead 1' through a crown 2 and fixed to the beads 1 and 1' at the both ends, a tread 4 covering the outer side of the carcass 3, and a breaker layer arranged in the crown 2 and on the outside of the carcass 3 and on the inside of the tread 4, said breaker layer consisting of two rubber coated glass cord layers 5 and two short cut fiber reinforced rubber layers 6 and 7, one layer 6 of which is arranged on the tread side of the glass cord layers 5 and the other layer 7 of which is arranged on the carcass side of the glass cord layers 5.

The following examples are given in illustration of this invention and are not intended as limitations thereof.

COMPARATIVE EXAMPLE

A rubber having a composition as shown in the following table was used.

|  | Part by weight |
| --- | --- |
| Natural rubber | 50 |
| SBR | 50 |
| Carbon black | 45 |
| Stearic acid | 2.0 |
| ZnO | 3.0 |
| Antioxidant | 1.7 |
| Vulcanization accelerator | 1.4 |
| Sulfur | 3.0 |

The rubber was compounded with short cut fibers to obtain 5 kinds of short cut fiber reinforced rubbers A to E as shown in the following Table 1. The reinforced rubber was rolled to a sheet having a thickness of 2.5 mm. As a control, a rubber coated nylon cord sheet having the same thickness was prepared.

The bending rigidity and plunger resistance of the sheets were tested. The obtained result is shown in Table 1.

The bending rigidity was determined by measuring a bending stress required for the same transformation by means of a Gurley stiffness tester made by Toyo Seiki K.K. The plunger resistance was determined by measuring a stress required for penetrating a steel rod having a radius of 0.5 mm at the top through a rectangular plain sheet sample clamped at the both ends and applied with a stress of 10 Kg/cm$^2$.

TABLE 1

| Sheet | Denier of cord, or diameter of short cut fibers | Length of cord or short cut fibers | Number of cords, or compounded amount of short cut fibers | Bending rigidity* | Plunger resistance** |
|---|---|---|---|---|---|
| Rubber alone | | | | 1 | 1 |
| Rubber coated nylon cord sheet | 840 d/2 | ∞ | 30/5 cm. | 2.5 | 2 |
| A (glass short cut fiber reinforced rubber sheet) | 9μ | 15 mm. | 5 PHR*** | 3.5 | 1.0 |
| B (glass short cut fiber reinforced rubber sheet) | 9μ | 15 mm. | 10 PHR*** | 5.0 | 5.0 |
| C (glass short cut fiber reinforced rubber sheet) | 9μ | 15 mm. | 10 PHR*** | 11.5 | 15.0 |
| D (glass short cut fiber reinforced rubber sheet) | 9μ | 15 mm. | 40 PHR*** | 13.0 | 31.0 |
| E (vinylon short cut fiber reinforced rubber sheet) | 25μ | 5 mm. | 20 PHR*** | 31.0 | 35.0 |
| | | | | | 92.0 |

*, ** The values of bending rigidity and plunger resistance are shown by the ratios when those of the sheet made only of rubber are 1.

*** The term "PHR" means part by weight of short cut fibers compounded to 100 parts of rubber.

EXAMPLE 1

Bias-belted tire containing the sheet prepared in the above Comparative Example was used, and the cornering power and abrasion resistance of tire and the breakage of glass cord were tested. The tested bias-belted tire was A C78-14, 4 ply tire, i.e., a tire for passenger cars having a size corresponding to 6.95-14. In the tire of Experiment No. 2, one rubber coated nylon cord layer was arranged on the tread side of glass cord breaker. In the tires of Experiment Nos. 3 to 8, short cut fiber reinforced rubber layers were arranged on both sides of glass cord breaker according to the method of the present invention. The cornering power (Kg/deg) was shown by the value determined under a load of 450 Kg per one tire. The abrasion resistance was determined by measuring the tread wear by means of a tread depth gauge after a 30,000 Km driving test. The breakage of glass cord was determined by cutting the tire and observing the breakage of glass cord after the same driving test. The carcass used in the tire was made from polyester fibers. The glass cord used in the tire was E.C.G.-75-5/0 glass cord. The driving test was effected under the following condition, that is, the road was ordinarily seen bad road, the load per one tire was 420 Kg, the inner pressure was 1.7 Kg/cm² and the average speed was 50 Km/H.

The obtained result is shown in the following Table 2.

EXAMPLE 2

Tires having a breaker layer composed of short cut fiber reinforced rubber layer and glass cord breaker as shown in the following Table 3 were produced. The glass cord used in this Example 2 was the same as used in Example 1. The tires were cut, and the tenacity of the glass cord was determined to obtain a result as shown in the following Table 3.

As a test piece, glass cords constituting the glass cord breaker layer and arranged on the tread side and carcass side were taken out, and each of the glass cords was tested with respect to the tenacity. The tenacity of the glass cord was determined by drawing the cord at a rate of 150 percent/mm by means of an Autograph S-300 tensile tester made by Shimazu Seisakusho.

TABLE 3

| Tire | Structure of carcass | Structure of breaker layer | Tenacity of glass cord (kg./cord) | |
|---|---|---|---|---|
| | | | Carcass side | Tread side |
| Conventional | Two nylon cord layers | Two glass cord layers | 22.0 | 26.5 |
| Do | Two rayon cord layers | do | 25.0 | 27.0 |
| Do | Two polyester cord layers | do | 23.5 | 26.5 |
| Do | do | Two glass cord layers plus one nylon cord layer [1] | 24.0 | 22.0 |
| Present invention | do | D [1] plus two glass cord layers plus D [2] | 28.0 | 28.5 |
| Do | do | E [1] plus two glass cord layers plus E [2] | 27.8 | 28.5 |
| Do | do | E [1] plus two glass cord layers plus D [2] | 28.0 | 28.0 |

[1] Tread side.
[2] Carcass side.

As mentioned above, in the pneumatic tire according to the present invention, decrease of tenacity of glass cord, which is peculiar to tires having a glass cord breaker, can be prevented. Moreover, the tire of the present invention has an excellent cornering power and abrasion resistance, and can prevent breakage of glass cord and penetration of foreign materials into the tire during the car is running.

What is claimed is:

1. An improved pneumatic tire, having a glass cord breaker layer, which comprises a pair of beads, a carcass composed of a rubber coated cord layer extending from one bead to the other bead through a crown and

TABLE 2

| Experiment number | Structure of breaker layer | Cornering power (kg./deg.) | Abrasion resistance [1] | Breakage of glass cord [2] | Remark |
|---|---|---|---|---|---|
| 1 | Only two glass cord layers | 50 | 100 | Broken wholly and crushed wholly along the glass cord layer. | Conventional tire. |
| 2 | Two glass cord layers plus one nylon cord layer [3] | 51 | 100 | Broken wholly and crushed locally along the glass cord layer. | Do. |
| 3 | A [3] plus two glass cord layers plus A [4] | 52 | 130 | Broken a little | Tire of the present invention. |
| 4 | B [3] plus two glass cord layers plus B [4] | 53 | 156 | do | Do. |
| 5 | C [3] plus two glass cord layers plus C [4] | 54 | 145 | Broken very little | Do. |
| 6 | D [3] plus two glass cord layers plus D [4] | 55 | 150 | do | Do. |
| 7 | E [3] plus two glass cord layers plus E [4] | 56 | 150 | do | Do. |
| 8 | E [3] plus two glass cord layers plus D [4] | 55 | 155 | do | Do. |

[1] The value of abrasion resistance is shown by the ratio when the value of the breaker layer composed only of two glass cord layers is 100.
[2] The term "broken" means that glass cord is broken, and the term "crushed" means that glass cord is crushed into white powders and loses its original cord shape.
[3] Tread side.
[4] Carcass side.

fixed to the beads at the both ends, a tread covering the outer side of the carcass, and a breaker layer arranged in the crown and on the outside of the carcass and on the inside of the tread, said breaker layer consisting of at least one rubber coated glass cord layer and at least two short cut fiber reinforced rubber layers, and at least one of said short cut fiber reinforced rubber layers being arranged on the carcass side and at least one on the tread side of the rubber coated glass cord layer, respectively, said short cut fiber layers extending continuously across the width of the said glass cord layer.

2. The tire as claimed in claim 1, wherein said short cut fiber is composed of glass, polyvinyl alcohol, rayon or polyester.

3. The tire as claimed in claim 1, wherein said short cut fiber is compounded with rubber in an amount of 5 to 100 parts by weight based on the 100 parts of the rubber.

4. The tire as claimed in claim 1, wherein said short cut fiber has a length of not longer than 30 mm and a ratio of the length to diameter of not less than 10.

5. The tire as claimed in claim 1, wherein said short cut fiber reinforced rubber layer has a thickness of 0.5 to 10 mm.

* * * * *